S. CALDWELL.
WAVE ACTUATED AIR COMPRESSOR.
APPLICATION FILED MAY 24, 1913.
1,085,242.
Patented Jan. 27, 1914.
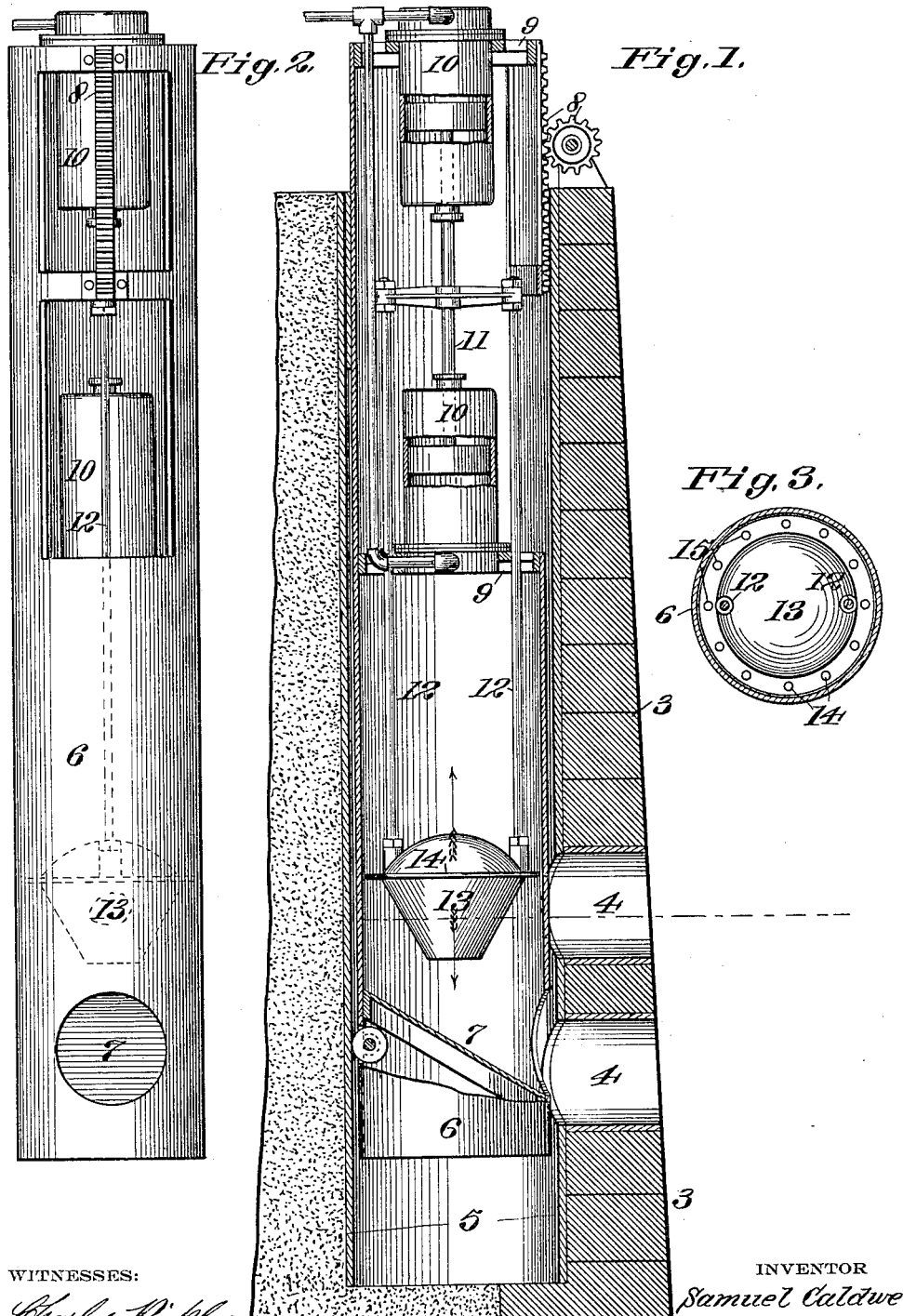
WITNESSES:
Charles Pickles
R. S. Berry
INVENTOR
Samuel Caldwell
BY G. H. Strong
ATTORNEY
COLUMBIA PLANOGRAPH CO., WASHINGTON, D. C.

UNITED STATES PATENT OFFICE.

SAMUEL CALDWELL, OF OAKLAND, CALIFORNIA, ASSIGNOR OF ONE-FOURTH TO BENJAMIN F. JOHNSON AND ONE-SIXTEENTH TO WILLIAM A. TOWNS, BOTH OF OAKLAND, CALIFORNIA.

WAVE-ACTUATED AIR-COMPRESSOR.

1,085,242. Specification of Letters Patent. Patented Jan. 27, 1914.

Application filed May 24, 1913. Serial No. 769,603.

*To all whom it may concern:*

Be it known that I, SAMUEL CALDWELL, a citizen of the United States, residing at Oakland, in the county of Alameda and State of California, have invented new and useful Improvements in Wave-Actuated Air-Compressors, of which the following is a specification.

This invention relates to motors, and particularly to a wave motor for compressing air or actuating other mechanism.

The object of the present invention is to provide an extremely substantial wave motor comprising a fixed wall having a plurality of apertures through which waves and tide may move, the force of the waves being transmitted to a float, and having means whereby the float or floats of the apparatus may be readily adjusted in accordance with the rise and fall of the tide, so that the maximum efficiency of the wave action at different elevations of the tide can be derived by the float and thence transmitted to an air compressing or other mechanism.

The invention consists of the parts and the construction and combination of parts as hereinafter more fully described and claimed, having reference to the accompanying drawings, in which—

Figure 1 is a side elevation and vertical section of the apparatus. Fig. 2 is a front view of the carrying tube of the compressing mechanism and float guide. Fig. 3 is a plan view of the float.

In the drawings there is shown a seawall 3 having superposed vertical inlets 4—4, into which waves from the sea will roll. The throats or inlets 4—4 communicate with a stand pipe or fixed well 5, which may be a metal tube or other substantial structure. Vertically movable in the well 5 is a slidable tube 6, shown in detail in Fig. 2, having at its lower end an inclined mouth or chute 7 which will be lifted vertically as the tube 6 is lifted by suitable gearing 8, in accordance with the rise or fall of the tide at the base of the seawall 3—3, so that as the tide rises the chute 7 can be brought into alinement with the higher throats 4 to derive the maximum force of the inwardly moving waves from the sea.

The tube 6 is shown as substantially closed at its lower portion and has at its upper part substantial guides, upon which are rigidly secured air compressors 10. The pistons of the compressors 10 are connected to a piston-rod 11, which in turn is connected to slide rods 12 extending down in the tube and movable separately therefrom by the rise and fall of a float 13 to which the rods 12 are rigidly secured. Thus, when the chute 7 of the tube 6 is adjusted in alinement with one of the throats 4, the inwardly rushing waves will run up the inclined bottom of the chute 7 and act against the float 13, which float will be forced upwardly, moving the slide rods 12 and the piston-rod 11 to compress air on the upward stroke in the uppermost air compressor 10. As the wave recedes from the chute 7 at the bottom of the tube 6, the weight of the float and its superposed mechanism will force the piston-rod 11 downwardly and compress air in the lower compressor 10.

In operation, when a wave rushes toward the mouth or chute 7 of the guide tube 6, a variable quantity of water will escape past a flange 14 of the tube, and, if desired, this horizontal flange may be perforated, as at 15, so as to allow a quantity of water to accumulate above the flange 15. Then when the wave recedes below the lifted float the superposed quantity of water above the flange will add its weight to that of the float and its superposed mechanism and impart the additional energy to compress air in the lower compressor 10.

Having thus described my invention, what I claim and desire to secure by Letters Patent is—

1. A wave-actuated mechanism comprising in combination with a seawall or other fixed element having a series of vertically superposed apertures or mouths, a float movable in a well communicating with said apertures, a means for controlling the mean elevation of the float in accordance with variations of tidal action, and an air compressing mechanism actuated by said float.

2. A power generating apparatus comprising in combination with a relatively fixed wall having a plurality of superposed apertures, of a tube having a throat adjustable in registration with the apertures in accordance with variation of tides, said tube having an inclined bottom against which a wave will impinge and be directed upwardly in the tube, a float movable independently of and in the tube, and an air compressing mechanism actuated by said float on its upward stroke by wave impulse actuated on the downward gravitating stroke of the float.

3. A power generating apparatus comprising a fixed wall having apertures through which waves may move at different levels of the tide, a tube having a mouth and an inclined bottom, means for vertically moving the tube into juxtaposition to the apertures in the wall with variations of the tide, and through which apertures and the mouth of the tube waves will flow and rise, a float movable independently of and in the tube and subjected to the action of the rising waves, air compressors mounted upon said tube and adjustable coördinately therewith, and connections between the float and the air compressors whereby the air compressors will be actuated on one stroke by wave impulse and on the other stroke by the force of gravity acting on the float and its connections.

In testimony whereof I have hereunto set my hand in the presence of two subscribing witnesses.

SAMUEL CALDWELL.

Witnesses:
W. W. HEALEY,
ZOE HARRISON.

---

Copies of this patent may be obtained for five cents each, by addressing the "Commissioner of Patents, Washington, D. C."